United States Patent [19]
Gustafson

[11] Patent Number: 6,128,908
[45] Date of Patent: Oct. 10, 2000

[54] CRYOGENIC LIQUID STORAGE TANK WITH INTEGRAL ULLAGE TANK

[75] Inventor: Keith W. Gustafson, Waleska, Ga.

[73] Assignee: MVE, Inc., New Prague, Minn.

[21] Appl. No.: 09/173,589

[22] Filed: Oct. 15, 1998

[51] Int. Cl.[7] ...................................... F17C 1/00
[52] U.S. Cl. ...................... 62/45.1; 220/560.04; 220/901
[58] Field of Search ................................... 62/45.1, 50.1; 220/560.04, 901

[56] References Cited

U.S. PATENT DOCUMENTS

| | | |
|---|---|---|
| 3,602,003 | 8/1971 | Hampton . |
| 5,005,362 | 4/1991 | Weltmer, Jr. et al. .................... 62/45.1 |
| 5,404,918 | 4/1995 | Gustafson . |
| 5,411,374 | 5/1995 | Gram . |
| 5,477,690 | 12/1995 | Gram ......................................... 62/45.1 |

OTHER PUBLICATIONS

LNG Express Jul./Aug. 1993: Article "Technology: Gram Integrated Fueling System"(pp. 2–5).

*Primary Examiner*—Ronald Capossella
*Attorney, Agent, or Firm*—Piper Marbury Rudnick & Wolfe

[57] ABSTRACT

An improved cryogenic liquid storage tank features a main tank containing a ullage tank. The top portion of the main tank communicates with the bottom portion of the ullage tank through a pipe segment and an opening in the ullage tank. The pipe segment is dimensioned and positioned so that the main tank fills with incoming cryogenic liquid while the ullage tank remains primarily empty. The restricted flow into the ullage tank causes the flow of cryogen into the main tank to decrease when the main tank is nearly full. This decrease in flow is utilized to terminate the filling of the tank. Removal of product from the main tank decreases the pressure and the liquid level therein so that liquid flows out of the ullage tank and is unable to return.

20 Claims, 3 Drawing Sheets

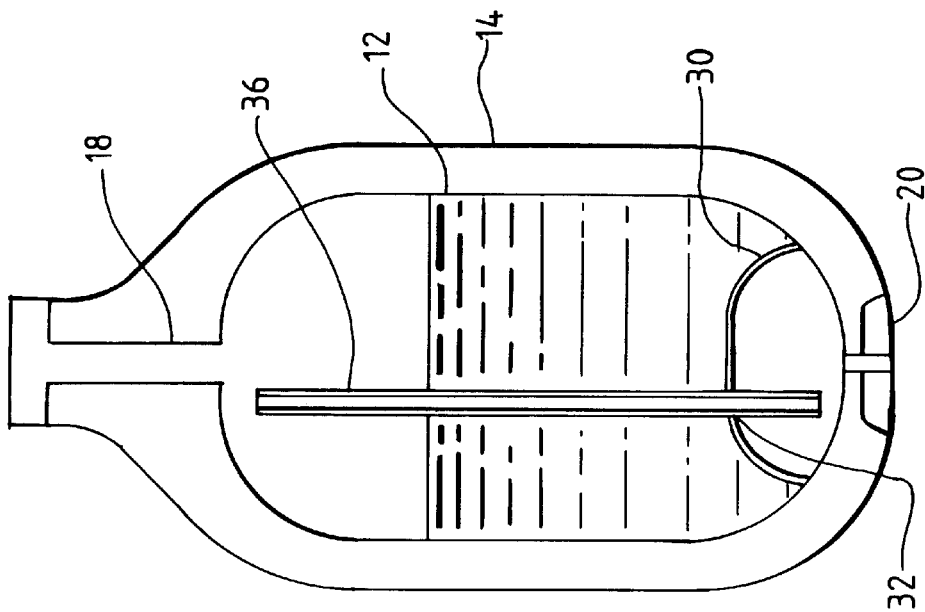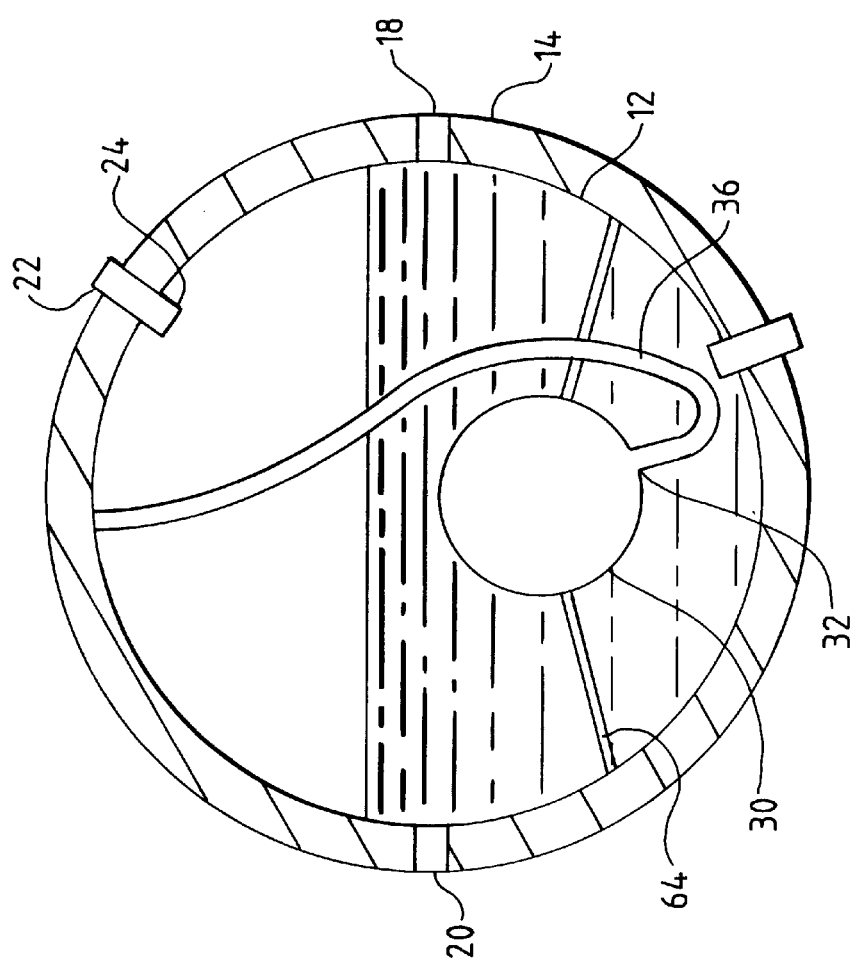

CRYOGENIC LIQUID STORAGE TANK WITH INTEGRAL ULLAGE TANK

BACKGROUND OF THE INVENTION

The invention relates generally to cryogenic liquid storage tanks, and, more particularly, to an improved storage tank for such liquids that features an improved ullage tank arrangement.

Cryogenic liquids are liquified gases that have boiling points generally below −150° F. at atmospheric pressure. Examples of cryogenic liquids include liquid natural gas (LNG), nitrogen, oxygen, carbon dioxide, methane and hydrogen.

Cryogenic liquids are usually stored in thermally insulated tanks that consist of an inner storage vessel mounted within an outer shell. The space between the inner vessel and outer shell is typically filled with insulation material and a vacuum may be drawn therein. Such an arrangement minimizes the transfer of heat from the ambient environment to the cryogenic liquid stored within the tank so that vaporization is minimized.

A cryogenic storage tank, no matter how well insulated, however, will always suffer from heat leakage between the ambient environment and the liquid cryogen. As a result, over time, the cryogenic liquid will warm. This causes the cryogenic liquid to expand so as to increase the pressure within the tank. As more time passes, the pressure in the tank will continue to increase. When the pressure reaches a critical level, it becomes necessary to vent the tank and release some of the vapor.

Single line or hose filling of such tanks is accomplished by spraying subcooled cryogenic liquid, that is, cryogenic liquid that is at a temperature and pressure below its vaporization point, into the top of the tank. This allows the vapor present in the tank to be collapsed and recondensed into liquid. As a result, venting is not required during filling and product losses associated therewith are avoided. In addition, metering is greatly simplified since, with the absence of venting, there is no outflow to subtract from the product delivered.

A problem associated with single line filling, however, is that it allows a tank to be filled almost 100% full of liquid. This severely reduces the hold time of the tank in that there is no room to accommodate the expansion of the cryogen as it warms over time.

Prior solutions to this problem have included mechanical and electronic liquid level sensing devices that stop the flow of cryogen into the tank prior to it becoming 100% full. Such devices, however, utilize either moving parts inside of the tank, which are prone to freezing, and/or external electronic connections, which are prone to damage or corrosion. In response to the shortcomings of such liquid level sensing shutoffs, cryogenic liquid storage tanks featuring ullage tanks have been developed.

U.S. Pat. No. 5,404,918 to Gustafson, assigned to the present assignee, discloses a cryogenic storage tank that features a main storage tank with a smaller ullage tank positioned therein. The tanks communicate through a relatively small passage in the bottom of the ullage tank. The passage has a flow rate capacity up to 30% of the main tank fill line. Because the fill line is significantly larger than the passage, the main tank will fill with liquid while the ullage tank remains substantially empty except for cryogenic vapor. When the main tank becomes full, a sharp pressure rise occurs due to the increased flow resistance of the passage. As a result, the flow into the main tank will decrease dramatically. This is detected by an external flow monitoring device and the fill operation is stopped. The vapor space left in the ullage tank allows space for liquid expansion due to heat leakage.

The liquid cryogen in the main tank cools the walls of the ullage tank so that the vapor therein is cooled to the temperature of the liquid in the main tank. As a result, a portion of the vapor in the ullage tank condenses so that the pressure therein decreases. The liquid in the ullage tank also reaches the same temperature as the liquid in the main tank. The minor pressure difference between the head spaces of the main tank and the ullage tank causes liquid to flow into the latter. As a result the liquid levels and the head space pressures in the main tank and the ullage tank will tend to equalize. When product is withdrawn from the main tank, liquid will flow from the ullage tank so that the liquid levels and head pressures in the two tanks once again equalize.

While the cryogenic liquid storage tank of the '918 patent provides a dramatic improvement in hold time over a tank that is 100% full of liquid cryogen, the vapor space provided for expansion is not constant. For example, a half full tank that has been standing idle for a period of time will generally have a half full ullage tank. If the main tank is then refilled, only half of the ullage tank space is available for its intended purpose.

A different system for controlling liquid levels is presented by U.S. Pat. No. 5,411,374 to Gram. The '374 patent discloses a system whereby a secondary tank is drained prior to the withdrawal of liquid from the main tank. The secondary tank communicates with at least two lines. One line allows liquid from the main tank to expand into the secondary tank. The second line allows liquid to be withdrawn from this tank. The withdrawal lines from the main tank and the secondary tank are externally connected to a control system that determines when to withdraw liquid from each tank to empty the secondary tank first and control the pressure in the main tank. While the system of the '374 patent is effective, it is difficult to construct and requires the use of external controls. These external controls add cost and maintenance requirements to the system.

Accordingly, it is an object of the present invention to provide an improved cryogenic liquid storage tank that permits control of the ullage tank liquid level.

It is another object of the present invention to provide an improved cryogenic liquid storage tank that permits control of the ullage tank level through thermodynamic principles instead of mechanical or electrical controls.

SUMMARY OF THE INVENTION

The present invention is directed to an improved cryogenic liquid storage tank that features a main tank with a ullage tank disposed therein. The top portion of the main tank communicates with the ullage tank through a generally vertically disposed pipe segment. The pipe segment, disposed within the ullage tank, has an effective flow rate that is less than the flow rate of the fill pipe for the main tank so that the ullage tank remains substantially free of liquid as the main tank is filled. Once the main tank is filled, the pressure in the main tank increases due to the flow restriction into the ullage tank. This causes the flow to decrease. The decrease in flow is detected to terminate the filling operation.

The ullage tank is then cooled by the surrounding cryogenic liquid so that vapor in the ullage tank reaches the same temperature as the liquid. This causes the pressure head in the ullage tank to collapse so that cryogenic liquid may flow into the ullage tank via the pipe segment. This allows the ullage tank to accommodate the expansion of the liquid in the main tank when it sits idle.

Withdrawal of cryogenic liquid from the main tank causes the pressure in the main tank to decrease relative to the ullage tank. Cryogenic liquid flows from the bottom of the ullage tank, via the pipe segment, into the main tank due to the pressure differential. When the liquid level in the main tank is below about 90%, only main tank vapor communicates with the ullage tank. The ullage tank thus completely empties of liquid before the main tank so that its total expansion volume is available should the main tank be refilled before it is empty. The availability of the maximum ullage volume can be further assured by placing the ullage tank along an exterior wall where heat leakage into the ullage tank causes a high pressure in the ullage tank relative to the main tank.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 2 is a section view showing a second embodiment of the improved cryogenic liquid storage tank with the ullage tank thermally isolated from the exterior wall;

FIG. 3 is a section view showing a third embodiment of the improved cryogenic liquid storage tank of the invention in a vertical tank.

DESCRIPTION OF THE PREFERRED EMBODIMENTS

Figure 1A:
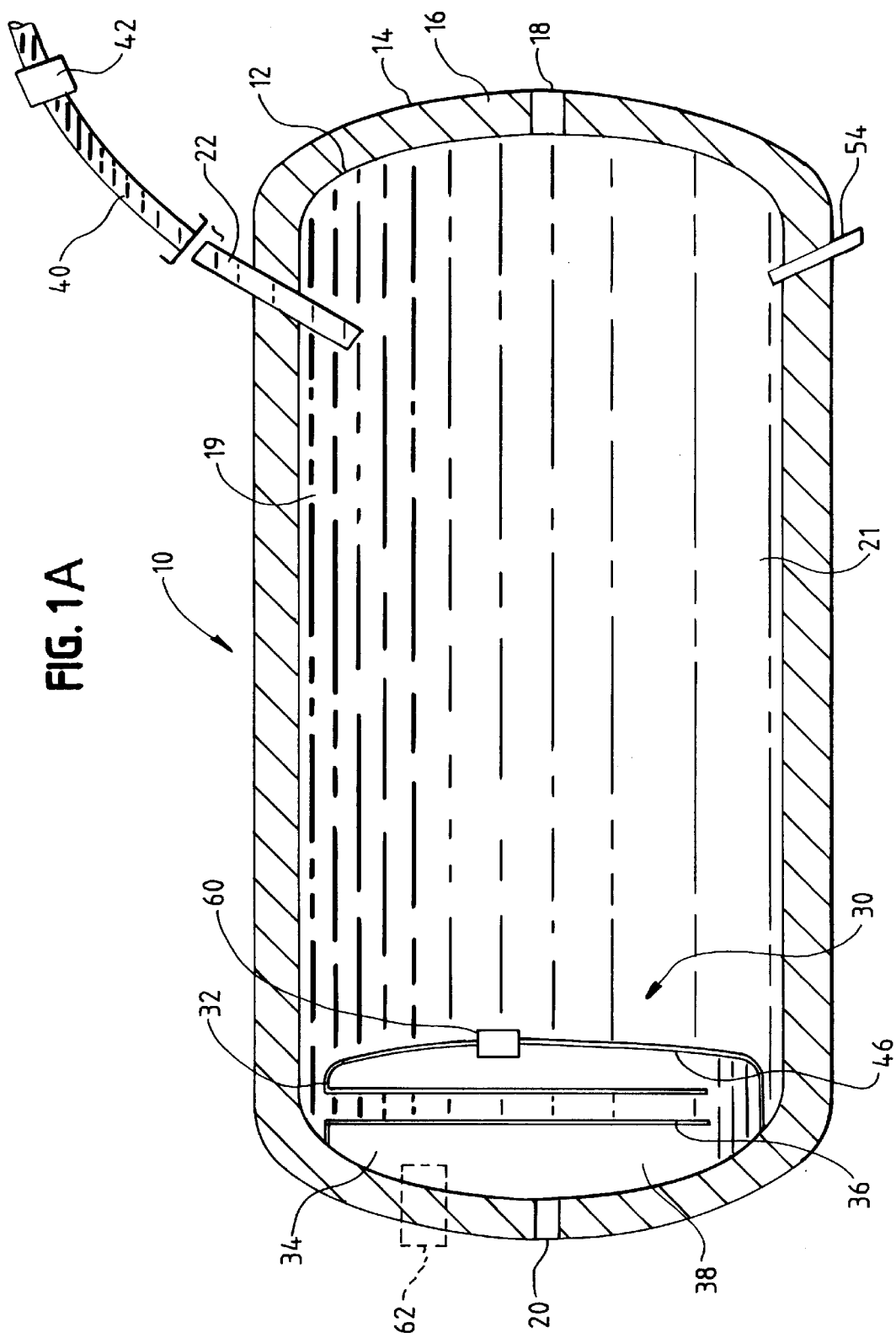
FIGS. 1A and 1B are section views showing an embodiment of the improved cryogenic liquid storage tank of the invention at the end of a filling operation and after reaching steady state, respectively.

With reference to FIG. 1A, an embodiment of the improved cryogenic liquid storage tank of the present invention is indicated generally at 10. Storage tank 10 features a main storage tank 12 surrounded by a jacket 14 to define an insulating space 16. As is known in the art, main storage tank 12 and jacket 14 are joined by front tank support 18 and rear tank support 20. Space 16 may be filled with an insulating material and a vacuum may be drawn therein to minimize heat transfer between the external environment and the interior of main tank 12. The interior of main storage tank 12 features a top portion 19 and a bottom portion 21.

While the insulation space 16 minimizes the transfer of heat to the cryogen stored in the tank, some heat transfer is inevitable causing the liquid cryogen to expand. To maximize hold time without venting, this expansion must be accommodated. The largest source of heat transfer occurs through front and rear tank supports 18 and 20.

A fill pipe 22 including a spray head 24 is provided to deliver cryogenic liquid to the interior of main tank 12. While fill pipe 22 is shown entering the top portion 19 of main tank 12, it is to be appreciated that the tank of the invention will also work with a bottom-fill because the fill operation is not greatly affected by submersion of the spray head 24.

A secondary or ullage tank 30 is located within the main tank 12 as shown in FIG. 1A. The actual volume ratio between main tank 12 and ullage tank 30 will vary due to operating pressure ranges and the geometry of the tanks. In a preferred embodiment, however, the volume of the ullage tank 30 is approximately 5–25% of the volume of the main tank 12.

Ullage tank 30 features a single opening, 32 adjacent to its top portion 34. A pipe segment 36 is connected to the opening 32 and leads to the bottom portion 38 of ullage tank 30. The effective flow rate of the pipe segment 36 is preferably about 15% of the flow rate of the fill pipe 22 to allow the main tank 12 to become full of cryogenic liquid while ullage tank 30 remains substantially empty. The effective flow rate of pipe segment 36 will vary with the diameter of opening 32, the diameter and length of pipe segment 36 and/or the proximity of the bottom of pipe segment 36 with the bottom of ullage tank 30. While pipe segment 36 is shown as a straight pipe section in a generally vertical orientation, it is to be understood that pipe segment 36 alternatively could have a variety of shapes and orientations. The various shapes and orientations may also impact the effective flow rate of pipe segment 36. For example, if pipe segment 36 featured a sharp bend, its effective flow rate would decrease.

As an example only, if fill pipe 22 has a ½ inch diameter passage, the combination of a ³⁄₁₆ inch diameter for opening 32 (and thus for pipe segment 36) with a 22 inch length for pipe segment 36 would be appropriate, if pipe segment bottom is well spaced from the bottom of ullage tank 30. Positioning the pipe segment bottom close to the bottom of ullage tank 30 could further decrease the effective flow rate. Clearly, a number of appropriate combinations of sizes for opening 32 and pipe segment 36, as well as spacings between the bottom of ullage tank 30 and the pipe segment bottom, exist for a given fill pipe size.

In operation, a source of liquid cryogen 40, and a flow monitoring device 42, are connected to fill pipe 22. Subcooled cryogenic liquid is then delivered to main tank 12. Opening 32 is preferably positioned so that it is not submerged until the main tank 12 is about 90% full.

Because the pipe segment 36 is more restrictive to flow than fill pipe 22, the pressure in main tank 12 increases significantly when it becomes full. Cryogenic liquid then flows through pipe segment 36 into ullage tank 30 (since the pressure in main tank 12 is higher than the pressure in ullage tank 30) as shown in FIG. 1A. As a result, the flow of cryogenic liquid into main tank 12 dramatically decreases. This decrease in flow causes a flow monitoring device 42 to terminate the flow of cryogenic liquid to main tank 12. The flow monitoring device 42 can be any device suitable for sensing liquid flow in a tube such as a pivot static tube or vane type flow sensor. Alternatively, pressure sensors can be used to sense pressure increases in the line 40.

Figure 1B:
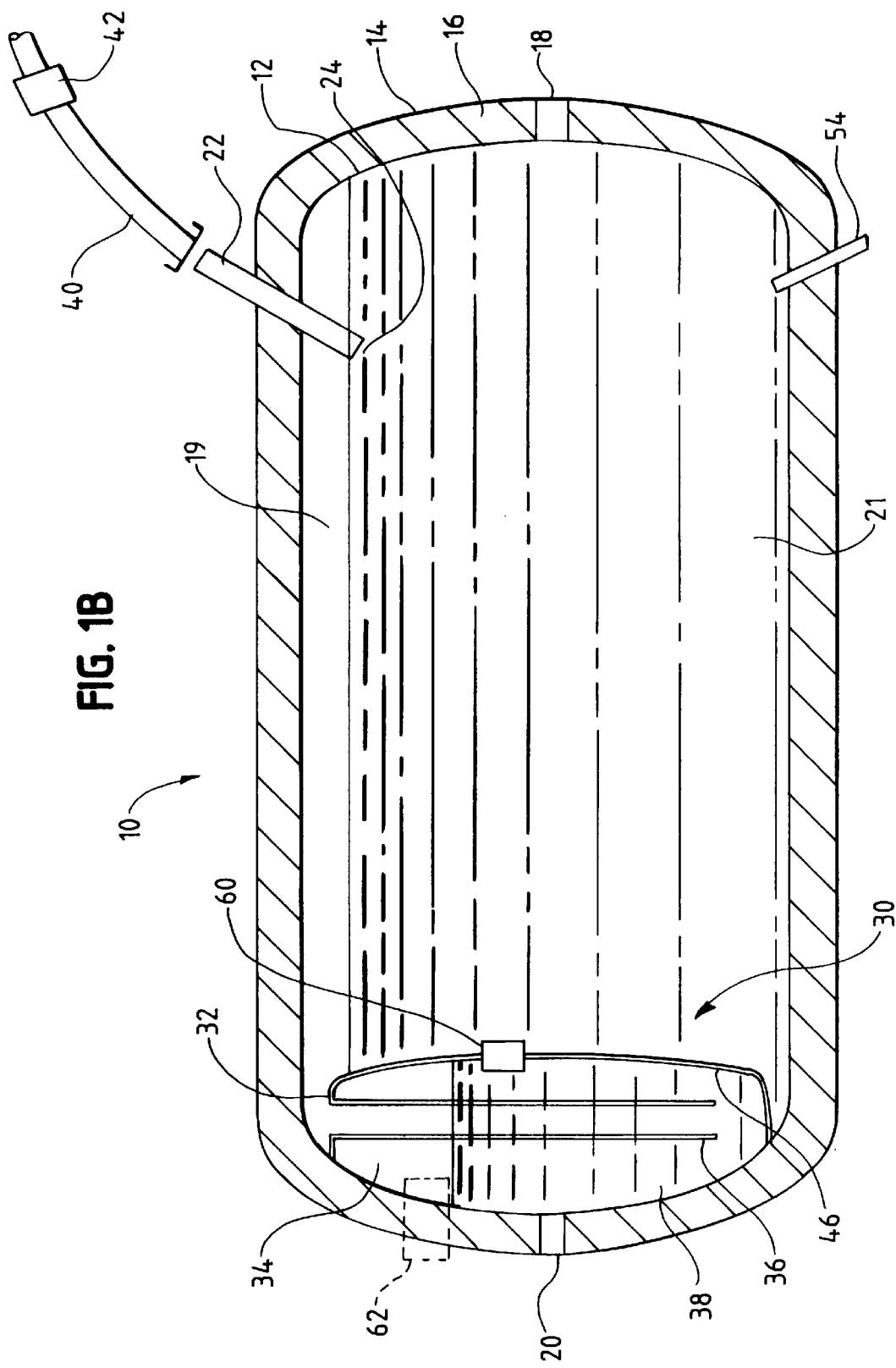

FIG. 1B shows storage tank 10 some time later after it has reached steady state. More specifically, after the delivery of cryogen to main tank 12 is complete, the liquid in main tank 12 will slowly continue to flow into ullage tank 30 via pipe segment 36 until the liquid level in the main tank falls below the level of opening 32 and the ullage tank is substantially full.

The resulting vapor spaces above the liquid cryogen in the top portions 19 and 34 of the main tank and the ullage tank, respectively, allow for expansion of the cryogenic liquid so that the hold time of the tank 10 is significantly increased.

As product is withdrawn from main tank 12, via use line 54, the pressure in main tank 12 decreases. The resulting pressure differential between ullage tank 30 and main tank 12 causes liquid cryogen to flow from the bottom portion 38 of the ullage tank 30, through the pipe segment 36 into main tank 12. In other words, cryogenic liquid begins to flow out of the ullage tank and back into main tank 12 because the ullage tank pressure head is higher than the pressure in the main tank 12 and because the main tank 12 is no longer full.

Because the opening 32 of ullage tank 30 is near the top of the main tank 12, liquid flows out of ullage tank 30 and doesn't return. Ullage tank 30 is thus emptied of liquid well before main tank 12. As a result, a large portion, if not all, of ullage tank 30 is again available to perform its function when main tank 12. is refilled.

While the above arrangement works well in situations where usage of tank 10 causes pressure swings in main tank 12, that is, higher pressure after filling or periods of non-use, with lower pressure after withdrawal of liquid, some cryogenic liquid tanks, such as liquid natural gas vehicle tanks, operate at nearly stationary pressure levels. In such situations, incoming heat balances the product outflow so that the pressure in the main tank 12 remains nearly constant. As a result, once the pressures in ullage tank 30 and main tank 12 equalize, there may be insufficient pressure differential to force liquid out of the ullage tank. Under these conditions, it is desirable to have a source of heat in communication with the ullage tank 30 to cause its pressure to be higher than that of the main tank 12.

One way to provide a source of heat to ullage tank 30 is to position it adjacent to a tank support, such as support 20 as illustrated in FIG. 1A. Tank support 20 is not well insulated, compared to the rest of the tank, so that it transfers heat from the ambient environment to ullage tank 30. This occurs independently of any decrease in the pressure of main tank 12 due to the withdrawal of liquid therefrom. The incoming heat offers the added advantage of preventing gas condensation and subsequent liquid accumulation inside of the ullage tank during idle periods. While the preferred embodiment of the invention has the ullage tank positioned against one of the main tank supports, any source of heat to the ullage tank 30 would suffice.

In situations where the application does cause pressure swings in main tank 12, a source of heat, such as support 20, in communication with ullage tank 30 still improves performance. More specifically, the pressure differential between main tank 12 and ullage tank 30 is increased not only due to the withdrawal of cryogenic liquid from main tank 12, and the resulting pressure drop therein, but also by the heating of the cryogen, and resulting increase in pressure, in ullage tank 30. The increased pressure differential causes cryogenic liquid to be more quickly driven through pipe segment 36 and into main tank 12 so that a larger portion of ullage tank 30 is available for vapor space formation.

Ullage tank 30 may optionally be provided with a relief device, indicated at 60 in FIG. 1A, to prevent the rupture of the ullage tank if the conduit 36 were to become blocked with foreign material or ice and the tank was allowed to warm to ambient temperature. The relief device 60 would be set to release the contents of ullage tank 30 into the main tank 12 should the pressure within the ullage tank exceed a predetermined level. As indicated in FIG. 1A at 62 in phantom, the relief device may alternatively be placed so that the ullage tank would depressurize to the external environment. The activation pressure of relief device 60 (or 62) would be low enough to prevent a rupture of the ullage tank, but above the pressure required to return cryogenic liquid to the main tank through the conduit 36. Suitable relief devices are known in the art and would include a rupture disc or a relief valve.

Alternative embodiments of the invention are shown in FIGS. 2 and 3 where like referenced numerals are used to identify the like elements previously described in reference to FIGS. 1A and 1B. In FIG. 2, an embodiment is shown wherein the ullage tank 30 is thermally insulated from the main tank exterior wall 14. More specifically, ullage tank 30 is supported within the main tank by metal straps 64 that are sized so that heat transfer is minimized. Alternatively, a tripod-like structure could be used to support the ullage tank within the main tank. FIG. 3 illustrates an embodiment of the invention wherein the ullage tank 30 is deployed in the bottom of a vertical storage tank. The operation of the tanks of FIGS. 2 and 3 is the same as previously described with regard to FIGS. 1A and 1B.

While the preferred embodiments of the invention have been shown and described, it will be apparent to those skilled in the art that changes and modifications may be made therein without departing from the spirit of the invention, the scope of which is defined by the appended claims.

What is claimed is:

1. A storage tank for cryogenic liquids comprising:
    a) a main tank adapted to receive cryogenic liquid therein via a fill pipe;
    b) a ullage tank disposed within said main tank and having an opening;
    c) a pipe segment open at both ends connected to said ullage tank opening for conveying liquid between a bottom portion of said ullage tank and a top portion of the main tank; and
    d) said pipe segment having an effective diameter that is less than said fill pipe such that said ullage tank does not fill with liquid until after said main tank is filled and said ullage tank empties of liquid faster than said main tank as liquid is dispensed from the main tank due to a pressure differential between said tanks.

2. The storage tank of claim 1 wherein said opening is in a top portion of said ullage tank and said pipe segment extends into said ullage tank.

3. The storage tank of claim 1 further comprising:
    a) a jacket surrounding said main tank so that an insulating space is defined there between; and
    b) a tank support of relatively high thermal conductivity disposed in said insulating space between said main tank and said jacket, said ullage tank being located in contact with said support so that heat is transferred to said ullage tank from the support so as to pressurize the ullage tank.

4. The storage tank of claim 1 further comprising a source of heat for said ullage tank so that it is pressurized to cause the cryogenic liquid therein to flow back to the main tank as liquid is dispersed from the main tank.

5. The storage tank of claim 1 further comprising a relief device for releasing pressure from said ullage tank when the ullage tank pressure exceeds a predetermined pressure level.

6. The storage tank of claim 1 further comprising a relief device for releasing pressure from said ullage tank into said main tank when the ullage tank pressure exceeds a predetermined pressure level.

7. The storage tank of claim 1 wherein the volume of the ullage tank is approximately 5 to 25% of the volume of the main tank.

8. The storage tank of claim 1 wherein the diameter of said pipe segment limits the effective flow rate of the pipe segment so it does not exceed 30% of the flow rate of said fill pipe.

9. The storage tank of claim 1 wherein said pipe segment is positioned so that liquid does not enter the ullage tank until the main tank is approximately 90% full.

10. A storage tank for cryogenic liquids comprising:
a) a main tank adapted to receive cryogenic liquid therein via a fill pipe;
b) a ullage tank disposed within said main tank and having an opening;
c) a pipe segment connected to the ullage tank opening and positioned to convey liquid between a bottom portion of said ullage tank and a top portion of said main tank so that when liquid is withdrawn from the main tank, a pressure differential is created that causes cryogenic liquid to be driven from the ullage tank through said pipe segment into the main tank; and
d) said pipe segment having an effective diameter that is less than said fill pipe such that said ullage tank remains substantially empty of liquid while said main tank is being filled.

11. The storage tank of claim 10 wherein said opening is in a top portion of said ullage tank and said pipe segment extends into said ullage tank.

12. The storage tank of claim 10 further comprising a source of heat for said ullage tank so that it is pressurized to cause the cryogenic liquid therein to flow back to the main tank as liquid is dispersed from the main tank.

13. The storage tank of claim 10 further comprising a relief device for releasing pressure from said ullage tank when the ullage tank pressure exceeds a predetermined pressure level.

14. The storage tank of claim 10 further comprising a relief device for releasing pressure from said ullage tank into said main tank when the ullage tank pressure exceeds a predetermined pressure level.

15. The storage tank of claim 10 wherein the volume of the ullage tank is approximately 5 to 25% of the volume of the main tank.

16. The storage tank of claim 10 wherein the diameter of said pipe segment limits the effective flow rate of the pipe segment so it does not exceed 30% of the flow rate of said fill pipe.

17. The storage tank of claim 10 wherein said pipe segment is positioned so that liquid does not enter the ullage tank until the main tank is approximately 90% full.

18. A storage tank for cryogenic liquids comprising:
a) a main tank adapted to receive cryogenic liquid therein via a fill pipe;
b) a ullage tank disposed within said main tank and having an opening;
c) a pipe segment open at both ends connected to said ullage tank opening for conveying liquid between a bottom portion of said ullage tank and a top portion of the main tank; and
d) said pipe segment having an effective diameter that is less than said fill pipe such that a measurable decrease in flow through the fill pipe occurs after said main tank is filled, said pipe segment being disposed such that said ullage tank empties of liquid as liquid is dispersed from the main tank due to a pressure differential between said tanks.

19. The storage tank of claim 18 wherein said opening is in a top portion of said ullage tank and said pipe segment extends into said ullage tank.

20. The storage tank of claim 18 further comprising:
a) a jacket surrounding said main tank so that an insulating space is defined there between; and
b) a tank support of relatively high thermal conductivity disposed in said insulating space between said main tank and said jacket, said ullage tank being located in contact with said support so that heat is transferred to said ullage tank from the support so as to pressurize the ullage tank.

* * * * *